United States Patent
Fujiwara et al.

(10) Patent No.: US 10,625,358 B2
(45) Date of Patent: Apr. 21, 2020

(54) ARC WELDER AND METHOD FOR CONTROLLING ARC WELDING

(71) Applicant: Panasonic Intellectual Property Management Co., Ltd., Osaka (JP)

(72) Inventors: Junji Fujiwara, Osaka (JP); Atsuhiro Kawamoto, Hyogo (JP); Kaito Matsui, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 203 days.

(21) Appl. No.: 14/569,936

(22) Filed: Dec. 15, 2014

(65) Prior Publication Data
US 2015/0096966 A1 Apr. 9, 2015

Related U.S. Application Data

(63) Continuation of application No. PCT/JP2013/006416, filed on Oct. 30, 2013.

(30) Foreign Application Priority Data

Nov. 7, 2012 (JP) ................................. 2012-245033

(51) Int. Cl.
*B23K 9/09* (2006.01)
*B23K 9/095* (2006.01)
(Continued)

(52) U.S. Cl.
CPC ............ *B23K 9/092* (2013.01); *B23K 9/0953* (2013.01); *B23K 9/173* (2013.01); *B23K 2101/34* (2018.08); *B23K 2103/04* (2018.08)

(58) Field of Classification Search
CPC ...... B23K 9/092; B23K 9/0953; B23K 9/124; B23K 9/125; B23K 9/173; B23K 9/09;
(Continued)

(56) References Cited

U.S. PATENT DOCUMENTS

| | | | | |
|---|---|---|---|---|
| 3,777,113 A | * | 12/1973 | Arikawa | B23K 9/092 219/130.51 |
| 6,642,483 B1 | * | 11/2003 | Koga | B23K 9/0953 219/130.01 |

(Continued)

FOREIGN PATENT DOCUMENTS

| | | |
|---|---|---|
| CN | 102548701 | 7/2012 |
| EP | 1 445 055 | 8/2004 |

(Continued)

OTHER PUBLICATIONS

Machine Translation of WO2010/146844.*
(Continued)

*Primary Examiner* — Tu B Hoang
*Assistant Examiner* — Erin E McGrath
(74) *Attorney, Agent, or Firm* — Wenderoth, Lind & Ponack, L.L.P.

(57) ABSTRACT

An arc welder alternately repeats a short circuit period in which a wire and a welding object are short-circuited and an arc period in which an arc occurs between the wire and the welding object. The arc welder includes a welding output section, a joint type setting section, a storage section, and a waveform parameter determining section. The welding output section performs welding output, and the joint type setting section sets a joint type. The storage section stores a plurality of combinations of joint types and waveform parameters. The waveform parameter determining section determines a waveform parameter based on the joint type set by the joint type setting section and the plurality of combinations. The welding output section performs welding output based on the waveform parameter determined by the waveform parameter determining section. Thus, vaporized zinc is easily released and sufficient welding is performed.

1 Claim, 10 Drawing Sheets

(51) Int. Cl.
*B23K 9/173* (2006.01)
*B23K 103/04* (2006.01)
*B23K 101/34* (2006.01)

(58) Field of Classification Search
CPC ........ B23K 9/091; B23K 9/093; B23K 9/095; B23K 9/1006
USPC .......................... 219/130.1–130.51, 137 PS
See application file for complete search history.

(56) References Cited

U.S. PATENT DOCUMENTS

| | | | |
|---|---|---|---|
| 2004/0074885 A1* | 4/2004 | Takatani | B23K 9/022 219/130.5 |
| 2006/0118527 A1 | 6/2006 | Schmitt et al. | |
| 2006/0131280 A1 | 6/2006 | Schmitt et al. | |
| 2008/0156781 A1 | 7/2008 | Artelsmair et al. | |
| 2008/0314884 A1 | 12/2008 | Fujiwara et al. | |
| 2009/0026188 A1 | 1/2009 | Schorghuber | |
| 2009/0152252 A1* | 6/2009 | Kawamoto | B23K 9/092 219/130.51 |
| 2010/0108654 A1* | 5/2010 | Ulrich | B23K 9/0953 219/130.5 |
| 2010/0126976 A1* | 5/2010 | Kawamoto | B23K 9/0953 219/125.1 |
| 2010/0326962 A1 | 12/2010 | Calla et al. | |
| 2011/0174784 A1 | 7/2011 | Kamei | |
| 2012/0074114 A1 | 3/2012 | Kawamoto et al. | |
| 2012/0080416 A1 | 4/2012 | Murakami et al. | |
| 2012/0145691 A1 | 6/2012 | Fujiwara et al. | |
| 2013/0082040 A1 | 4/2013 | Kawamoto et al. | |
| 2013/0082041 A1 | 4/2013 | Kawamoto et al. | |
| 2014/0021182 A1* | 1/2014 | Peters | B23K 9/0216 219/130.21 |

FOREIGN PATENT DOCUMENTS

| | | |
|---|---|---|
| JP | 63-016868 | 1/1988 |
| JP | 07-009149 | 1/1995 |
| JP | 07-051859 | 2/1995 |
| JP | 08-025080 | 1/1996 |
| JP | 08-118016 | 5/1996 |
| JP | 08-309533 | 11/1996 |
| JP | 09-085442 | 3/1997 |
| JP | 11-005188 | 1/1999 |
| JP | 11-285827 | 10/1999 |
| JP | 2004-181526 | 7/2004 |
| JP | 2005-219086 | 8/2005 |
| JP | 2006-142382 | 6/2006 |
| JP | 2007-216268 | 8/2007 |
| JP | 2008-531283 | 8/2008 |
| JP | 2008-542027 | 11/2008 |
| JP | 2009-072814 | 4/2009 |
| JP | 2009-214148 | 9/2009 |
| JP | 2009-233707 | 10/2009 |
| JP | 2010-094703 | 4/2010 |
| JP | 2011-5550 | 1/2011 |
| JP | 2011-098375 | 5/2011 |
| JP | 2012-006020 | 1/2012 |
| JP | 4950819 | 3/2012 |
| JP | 2012-076131 | 4/2012 |
| JP | 2012-081501 | 4/2012 |
| JP | 5370089 | 9/2013 |
| WO | 2010/051104 | 5/2010 |
| WO | 2010/146844 | 12/2010 |
| WO | 2011/013305 | 2/2011 |
| WO | 2012/032702 | 3/2012 |

OTHER PUBLICATIONS

Extended European Search Report dated Dec. 16, 2015 in European Application No. 13853190.0.
International Search Report of PCT application No. PCT/JP2013/006416 dated Jan. 28, 2014.
English Translation of Chinese Search Report dated Oct. 10, 2015 in Chinese Application No. 201380043212.1.

* cited by examiner

| Peak current IP | Joint shape | |
|---|---|---|
| | Horizontal fillet | Lap fillet |
| 200A | × (Pore) | × (Pore) |
| 250A | ○ | × (Pore) |
| 300A | ◎ | × (Pore) |
| 350A | ○ | × (Pore) |
| 400A | × (Hole opening) | ○ |
| 450A | × (Hole opening) | ◎ |
| 500A | × (Hole opening) | ○ |
| 550A | × (Hole opening) | × (poor appearance) | ns
ARC WELDER AND METHOD FOR CONTROLLING ARC WELDING

BACKGROUND

1. Technical Field

The present invention relates to an arc welder and a method for controlling arc welding that perform welding by alternately generating a short circuit state and arc state while repeating the forward feeding and backward feeding as the feeding of a welding wire as a consumable electrode.

2. Background Art

When a galvanized steel plate is welded, generally, short circuit transfer welding ($CO_2$ welding or metal active gas (MAG) welding) and pulse MAG welding achieve widespread use. FIG. 10 and FIG. 11 illustrate a conventional method for controlling arc welding for welding the galvanized steel plates together. FIG. 10 shows a bead cross section when the galvanized steel plates are welded together by a general consumable-electrode-type arc welding as a welding method.

The surface of each galvanized steel plate 26 is plated with zinc plating 27. The boiling point of zinc contained in zinc plating 27 is 907° C., and is lower than a melting point of iron of 1536° C. When galvanized steel plates 26 are arc-welded together, zinc vaporizes, and the vaporized zinc starts to diffuse to the outside through a melt pool. When the solidification speed of the molten metal is high, however, the vaporized zinc does not sufficiently diffuse to the outside and remains as air hole 28 in weld bead 35 and on a surface of weld bead 35. When air hole 28 remains in weld bead 35, a blowhole is formed. When air hole 28 opens in the surface of weld bead 35, a pit is formed. Both the blowhole and pit damage the strength of the welding part. Therefore, in an automobile industry where many galvanized steel plates 26 are used, occurrence of air hole 28 needs to be suppressed. In many cases, especially, the amount of pit generation is defined for management.

FIG. 11 shows a waveform example of each parameter of short circuit welding by a conventional technology. FIG. 11 shows time variation in welding current I, welding voltage V, wire feeding speed WS, motor ON/OFF switch signal N, and motor polarity switch signal K.

In FIG. 11, the period from time t1 to time t2 is a short circuit period. Current control is started at time t1, namely the beginning of the occurrence of a short circuit, and welding current I is increased at a predetermined gradient. Wire feeding speed WS is reduced to wire feeding speed WS2 lower than base wire feeding speed WS1. Immediately before the end of the short circuit period, namely immediately before time t2, the current control is performed so that a constriction in a molten welding wire is detected and welding current I is steeply decreased, as shown conventionally.

In FIG. 11, the period from time t2 to time t6 is an arc period. In the period from time t2 to time t3 in the arc period, current control is started at time t2, namely the beginning of arc generation, and welding current I is increased at a predetermined gradient. Welding current I is increased so that peak current IP thereof becomes 200 A or higher. Wire feeding speed WS is increased from wire feeding speed WS2 to base wire feeding speed WS1. For example, in the case of $CO_2$ welding, the concentration property of arc is high. Therefore, as peak current IP of welding current I increases, the arc force more strongly presses the melt pool, which is a molten part of a welding object, and hence the welding object is dented. In the worst-case scenario, a hole opening (burn-through) can be formed in the welding object. While, when peak current IP is extremely low, a micro short circuit can occur. Therefore, in order to prevent the micro short circuit from occurring and prevent the melt pool from being dented, peak current IP needs to be set at required minimum welding current I. The following operation may be employed:

after welding current I becomes peak current IP, welding current I is kept at peak current IP for a predetermined time, and the end of the period in which welding current I is kept is set at time t3.

At time t2 immediately after arc generation, a low speed state is shown where wire feeding speed WS starts to increase from wire feeding speed WS2 to base wire feeding speed WS1. Therefore, even if peak current IP is not set to be higher than necessary, the arc length can be secured by burning the wire. Thus, the micro short circuit can be suppressed.

In the period from time t3 to time t4 in the arc period, the welding voltage is constant-voltage-controlled. Welding current I is output so that base welding voltage VP as a base voltage of the constant voltage control can be output. The arc length can be kept by constant voltage control. Therefore, an arc state where a micro short circuit hardly occurs can be kept.

In the period from time t4 to time t5 in the arc period, current control is performed to decrease welding current I to base current IB. Base current IB is 100 A or lower. This value is a current value at which spatter of large grain size hardly occurs even if a micro short circuit occurs. In the period from time t4 to time t5, the decrease in welding current I is performed at a predetermined gradient. Thus, rapid variation of the arc state can be reduced by decreasing welding current I at the predetermined gradient so that welding current I becomes base current IB after a predetermined time from the arc start.

In the period from time t5 to time t6 in the arc period, the state of base current IB is kept by constant current control, and this state is kept until time t6 at which a short circuit occurs. Thus, keeping welding current I at base current IB produces the following effect:

a state where short circuit is apt to occur is secured and, even if a micro short circuit occurs, low welding current I prevents spatter of large grain size from occurring.

In the conventional method for controlling arc welding (for example, Unexamined Japanese Patent Publication No. 2007-216268), a cycle of the short circuit period and arc period is repeated.

SUMMARY

In the conventional method for controlling arc welding, in the period from time t2 to time t3 in the arc period, current control is started at time t2, namely the beginning of arc generation, and welding current I is increased to peak current IP of 200 A or higher at a predetermined gradient. Regarding the conventional welding apparatus, a peak current corresponding to a combination of a wire material, used gas, and wire diameter is stored in the welding apparatus, a peak current determined based on the wire material, used gas, and wire diameter is output.

In welding of a galvanized steel plate, however, an appropriate peak current is required for facilitating the release of vaporized zinc. The higher the peak current is, the easier vaporized zinc is released. However, for some joint types, high peak current produces a hole opening. In various joint types, release of vaporized zinc cannot be reconciled with suppression of a hole opening in a welding object.

Therefore, a peak current appropriate for each joint type is required. However, the conventional technology where one peak current is stored in the welding apparatus cannot respond to various joint types. In other words, in the conventional technology, determination of peak current in consideration of the joint type is not performed. Therefore, for example, when one set current corresponds to welding objects of different joint types, a single value is used as the peak current.

When the vaporized zinc cannot be released sufficiently, the vaporized zinc floats in a melt pool and is released from the surface of the melt pool. Therefore, the molten metal spouted during the release of the vaporized zinc scatters as spatter to the outside. Alternatively, the molten metal spouted during the release of the vaporized zinc short-circuits with a welding wire and scatters as spatter due to electric energy. Thus, an unusually large amount of spatter occurs.

In order to address the above-mentioned problems, an arc welder of the present invention alternately repeats the short circuit period in which the wire and the welding object are short-circuited and the arc period in which an arc occurs between the wire and the welding object. The arc welder includes a welding output section, a joint type setting section, a storage section, and a waveform parameter determining section. The welding output section performs a welding output, and the joint type setting section sets a joint type. The storage section stores a plurality of combinations of joint types and waveform parameters. The waveform parameter determining section determines a waveform parameter based on the joint type set by the joint type setting section and the plurality of combinations. The welding output section performs welding output based on the waveform parameter determined by the waveform parameter determining section.

In an a method for controlling arc welding of the present invention, the short circuit period in which the wire and the welding object are short-circuited and the arc period in which arc occurs between the wire and the welding object are alternately repeated. This method for controlling arc welding includes a step of setting a joint type, a step of determining a waveform parameter based on the joint type, and a step of controlling the welding output based on the waveform parameter.

In the present invention, when a welding object such as a galvanized steel plate having undergone surface treatment is welded using a wire for welding, an appropriate peak current can be output in response to the joint type. Thus, a hole opening (burn-through) is not formed in the welding object, and gas generated from the welding object releases from an exposed area when the melt pool is pressed so as to expose a root part of the welding object. Thus, occurrence of a blowhole and pit and occurrence of spatter can be suppressed.

DESCRIPTION OF EMBODIMENTS

A consumable-electrode-type arc welder and method for controlling arc welding in accordance with an exemplary embodiment of the present invention are described with reference to FIG. 1 through FIG. 9.

Exemplary Embodiment

Figure 1:
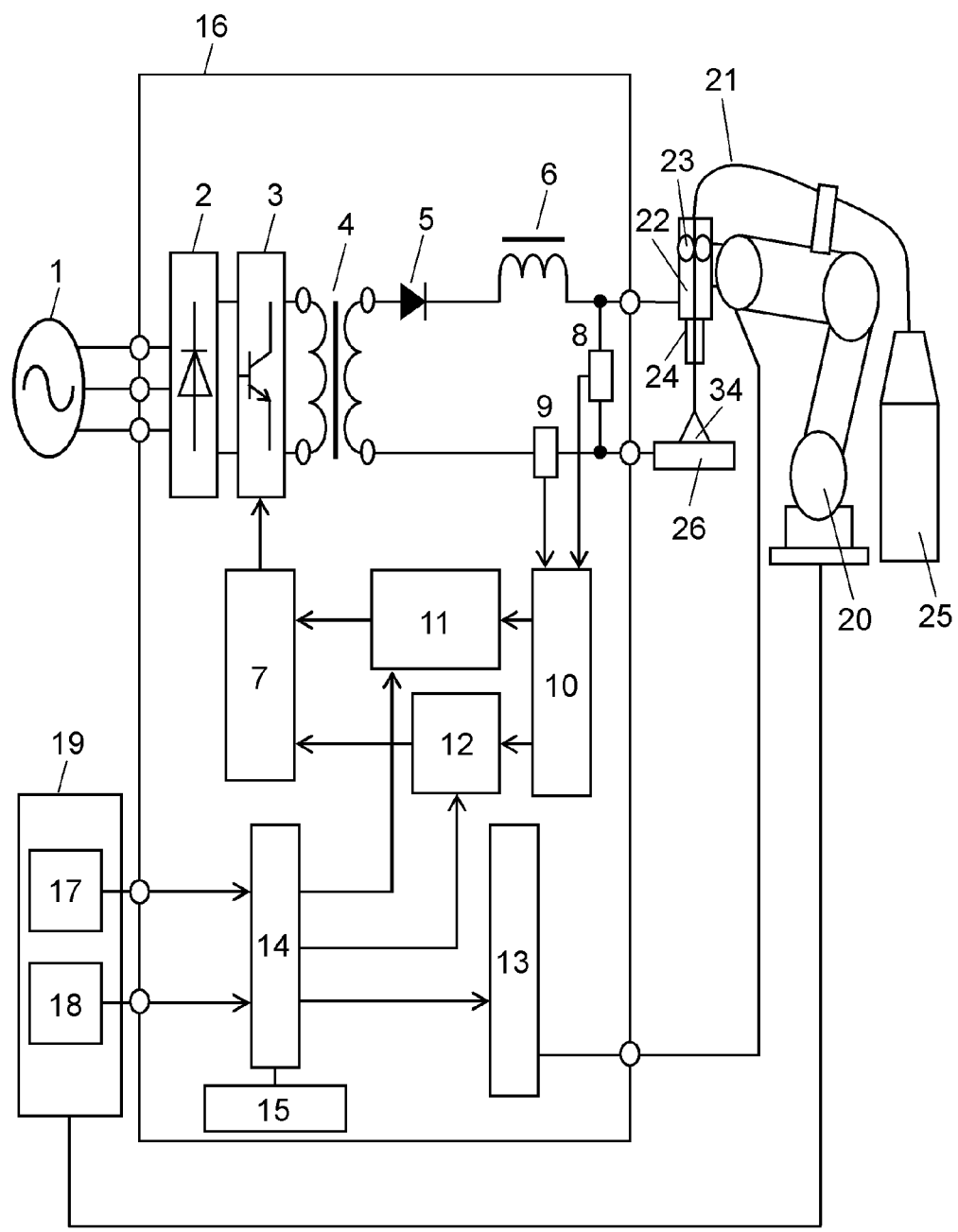
FIG. 1 is a diagram showing a schematic configuration of an arc welder in accordance with an exemplary embodiment of the present invention.

FIG. 1 shows a schematic configuration of an arc welder in the present exemplary embodiment. In FIG. 1, welding power supply device 16 includes primary rectifying section 2, switching section 3, transformer 4, secondary rectifying section 5, reactor 6, driving section 7, welding voltage detecting section 8, welding current detecting section 9, short-circuit/arc detecting section 10, short-circuit control section 11, arc control section 12, wire feeding speed control section 13, waveform parameter determining section 14, and waveform parameter storage section 15. Primary rectifying section 2 rectifies an output of input power supply 1. Switching section 3 controls a welding output by controlling the output of primary rectifying section 2. Transformer 4 converts electric power supplied from switching section 3. Secondary rectifying section 5 rectifies a secondary-side output of transformer 4. Reactor 6 is connected to secondary rectifying section 5 in series. Driving section 7 drives switching section 3. Welding voltage detecting section 8 detects the welding voltage. Welding current detecting section 9 detects the welding current. Short-circuit/arc detecting section 10 determines whether the welding state is a short circuit state or arc state based on one or both of the output of welding voltage detecting section 8 and the output of welding current detecting section 9. Short-circuit control section 11 controls driving section 7 in the short circuit period. Arc control section 12 controls driving section 7 in the arc period. Waveform parameter storage section 15 stores the welding condition or a waveform parameter for each joint type. Waveform parameter determining section 14 determines the welding condition or a waveform parameter corresponding to each joint type. Wire feeding speed control section 13 controls the feeding of a welding wire based on the wire feeding speed output from waveform parameter determining section 14.

In welding power supply device 16, when short-circuit control section 11 receives, from short-circuit/arc detecting section 10, a signal indicating that the welding state is the short circuit state, short-circuit control section 11 controls the short circuit current so that the short circuit is released. When arc control section 12 receives, from short-circuit/arc detecting section 10, a signal indicating that the welding state is the arc state, arc control section 12 outputs welding waveform parameters such as peak current IP in the arc period. Peak current IP is a maximum welding current value after the release of the short circuit.

Robot control device 19 for controlling the operation of robot 20 includes welding condition setting section 17 and joint type setting section 18. Welding condition setting section 17 sets a welding condition. Joint shape setting section 18 sets a joint type, namely a lap fillet as a lap joint or a horizontal fillet as a T joint. Robot control device 19 is communicably connected to welding power supply device 16.

Waveform parameter determining section 14 determines a waveform parameter based on the set welding current set by welding condition setting section 17 and the set joint type set by joint type setting section 18. The waveform parameter determined by waveform parameter determining section 14 is output to short-circuit control section 11, arc control section 12, and wire feeding speed control section 13. Upon receiving the waveform parameter, wire feeding speed control section 13 outputs a control signal of wire feeding speed Wf to robot 20.

For example, a worker operates welding condition setting section 17 to set the set welding current, and operates joint type setting section 18 to set the set joint type. The waveform parameter includes a parameter such as predetermined cycle and predetermined amplitude of a cyclically varying wire feeding speed, and a parameter related to welding current such as peak current or base current, for example. Waveform parameter storage section 15 stores a plurality of combination patterns where the set welding current, set joint type, and waveform parameter are associated with each other.

Arc control section 12 receives waveform parameters such as peak current IP from waveform parameter determining section 14 and outputs the parameters such as peak current IP in the arc period to driving section 7, thereby controlling the welding output. Torch 22 for welding having chip 24 is attached on robot 20. Wire feeding section 23 having a feeding roller controls the feeding of welding wire 21 based on a control signal of wire feeding speed Wf sent from wire feeding speed control section 13. Welding wire 21 is stored in wire holding section 25.

Figure 2:
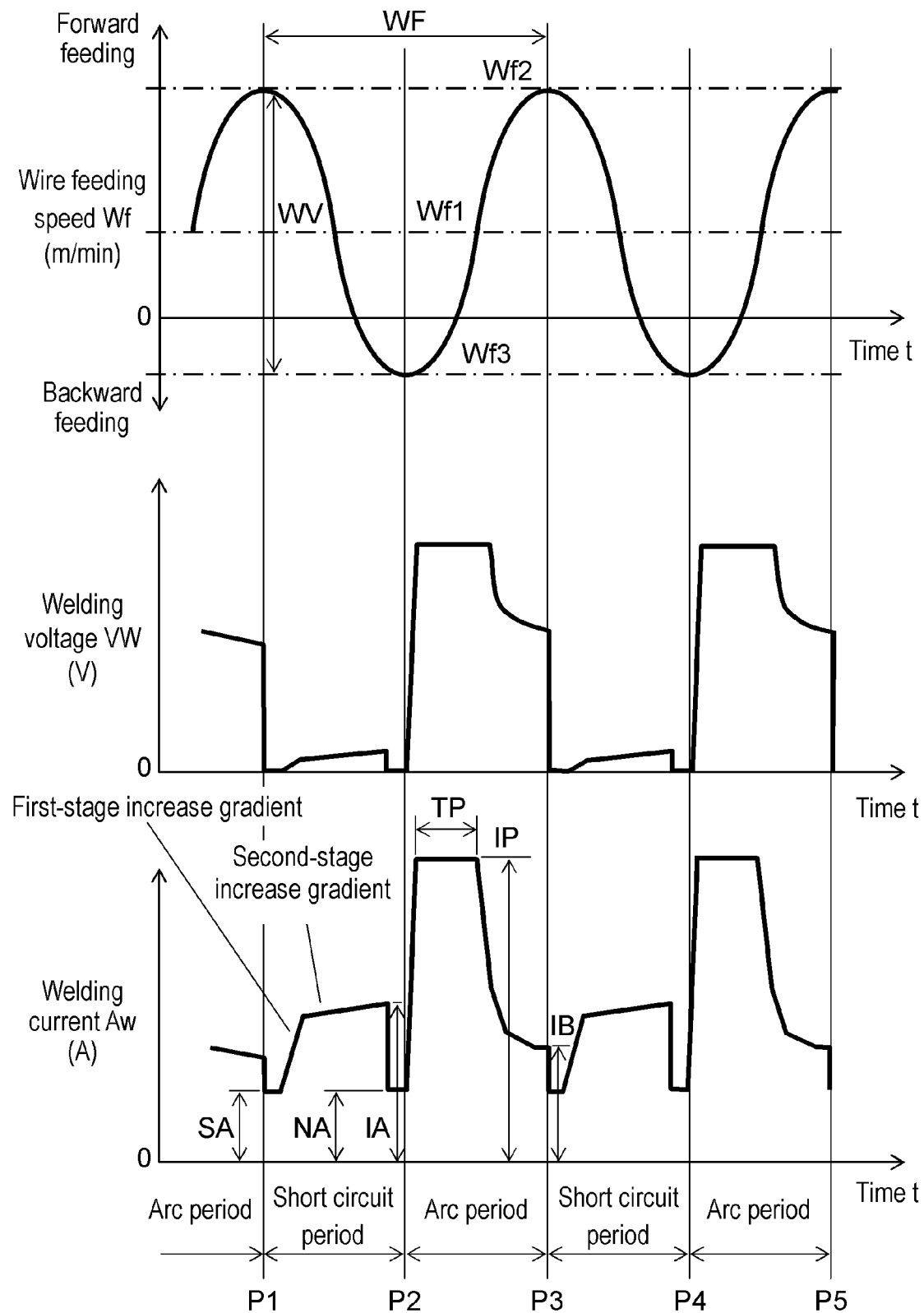
FIG. 2 is a diagram showing waveforms of wire feeding speed (sine wave), welding voltage, and welding current in accordance with the exemplary embodiment of the present invention.

FIG. 2 shows the waveforms of time variation in wire feeding speed, welding current, and welding voltage in the consumable-electrode-type arc welding where the short circuit period and the arc period are alternately repeated.

First, wire feeding control is described in FIG. 2.

In FIG. 2, wire feeding speed Wf includes predetermined constant reference speed Wf1, predetermined cycle WF (predetermined frequency), and predetermined speed amplitude WV. The wire feeding is controlled so that wire feeding speed Wf cyclically repeats forward feeding and backward feeding in a sine wave as a base wave. Wire feeding speed Wf becomes forward feeding peak speed Wf2 at the peak time on the forward feeding side, and a short circuit occurs around time P1. Wire feeding speed Wf becomes backward feeding peak speed Wf3 at the peak time on the backward feeding side, and an arc occurs around time P2. The next short circuit occurs around time P3, which is the peak time of forward feeding after time P2.

The period from time P1 to time P3 is set as one control cycle, and the operation in this period is repeated for welding. Thus, the occurrence of the short circuit state or arc state essentially depends on the wire feeding control where the forward feeding and backward feeding of the wire feeding speed are cyclically repeated.

Next, welding control is described in FIG. 2.

Time P1 shows the start time of the short circuit. In a predetermined period from time P1, the welding current is output at short circuit initial current SA, and then is increased at first-stage increase gradient di/dt of the short circuit current. Subsequently, the welding current is increased at second-stage increase gradient di/dt of the short circuit current, which is gentler than first-stage increase gradient di/dt of the short circuit current.

Then, immediately before time P2, when the release of the short circuit approaches, a droplet constriction is formed between the melt pool formed in welding object 26 and the tip of welding wire 21. When the droplet constriction is detected, the welding current is instantly decreased to constriction current NA, which is lower than the current when the droplet constriction is detected. Immediately before the decrease to constriction current NA, the welding current is short circuit peak current IA.

Time P2 shows the time when the droplet constriction separates to release the short circuit, the short circuit state finishes, and the arc state occurs. In the arc period from time P2, immediately after the release of the short circuit (immediately after arc generation), the welding current is output at a value of peak current IP in peak current period TP. The welding current then decreases from peak current IP to base current IB. Then, the welding current arrives at base current IB and keeps base current IB until the next short circuit state starts.

Time P3 shows the time when a short circuit occurs subsequently to the short circuit occurring at time P1, the state at time P3 is the same as that at time P1.

Hereinafter, a mechanism of releasing vaporized zinc when the galvanized steel plates are welded together is described.

Figure 3A:
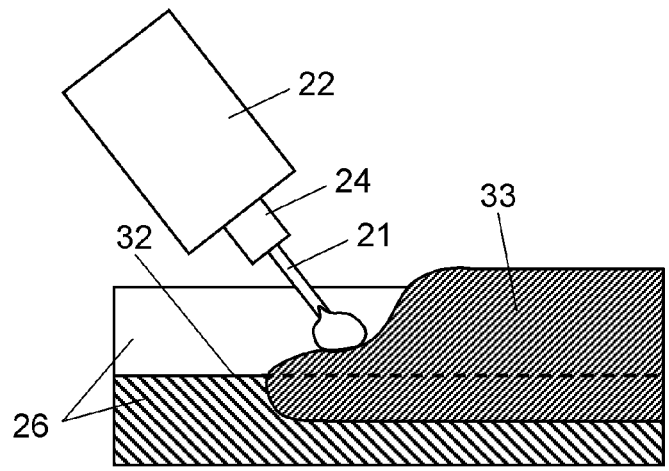
FIG. 3A is a diagram showing a cross section parallel with a weld line in a short circuit state in accordance with the exemplary embodiment of the present invention.
Figure 3B:
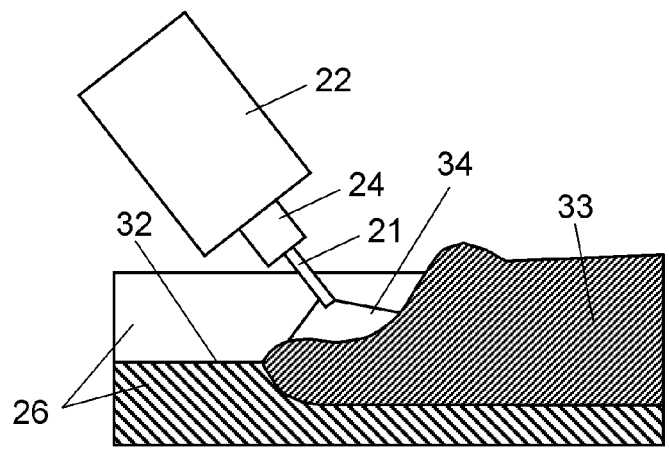
FIG. 3B is a diagram showing a cross section parallel with the weld line in a state at the start of peak current period TP immediately after the release of the short circuit in accordance with the exemplary embodiment of the present invention.
Figure 3C:
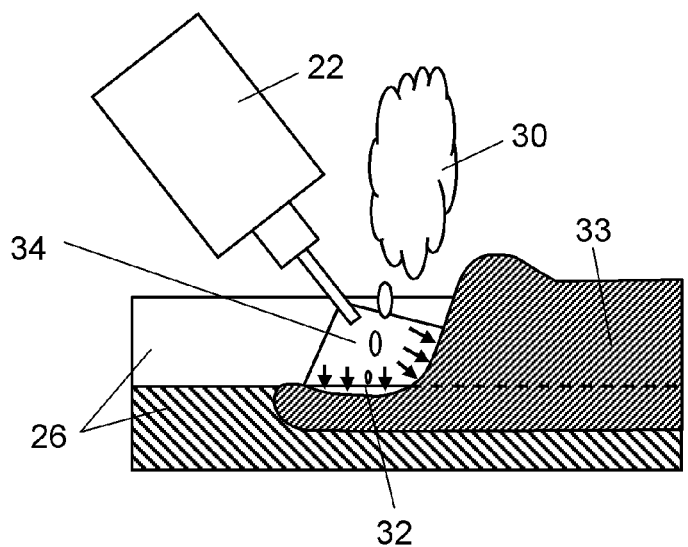
FIG. 3C is a diagram showing a cross section parallel with the weld line in a state at the end of peak current period TP in accordance with the exemplary embodiment of the present invention.

FIG. 3A through FIG. 3C show cross sections parallel with the weld line. FIG. 3A shows the short circuit state, FIG. 3B shows the state at the start of peak current period TP immediately after the release of the short circuit, and FIG. 3C shows the state at the end of peak current period TP.

In the short circuit state of FIG. 3A, root part 32 of welding objects 26 is covered with molten metal 33. In the state of FIG. 3B at the start of peak current period TP immediately after the release of the short circuit, however, arc 34 starts to press molten metal 33 in root part 32 of welding objects 26. In the state of FIG. 3C at the end of peak current period TP, arc 34 has completely pressed molten metal 33 out of root part 32 of welding objects 26.

Thus, immediately under arc 34, molten metal 33 in root part 32 of welding objects 26 is pressed out by an arc force of arc 34, and root part 32 is exposed. In this mechanism, vaporized zinc 30 is easily released to the outside from zinc plating vaporizing section 31 of FIG. 6 that is an overlapping part of an upper plate and lower plate as welding objects 26.

In order to achieve this mechanism, preferably, gas such as $CO_2$ having high concentration property of arc is employed so as to easily press molten metal 33 in root part 32 of welding objects 26. When torch 22 is made to have an attitude of a sweptback angle, molten metal 33 can be pressed in the direction opposite to the welding direction, and, in addition, the release effect of vaporized zinc 30 can be exerted.

Figures 5, 6:
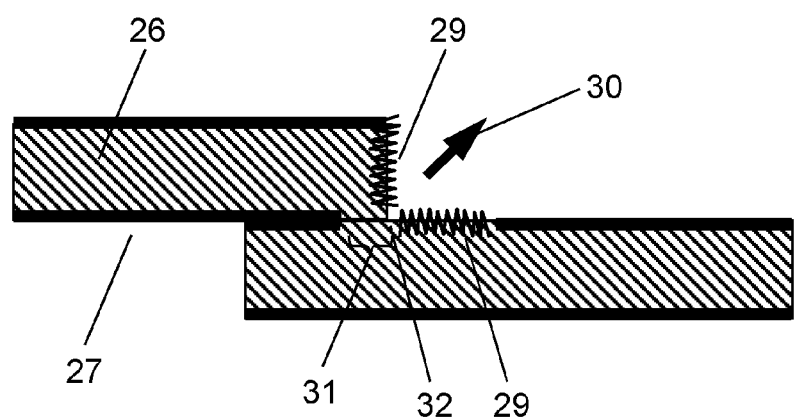
FIG. 5 is a diagram showing an application range of the peak current for different joint types in accordance with the exemplary embodiment of the present invention.
FIG. 6 is a diagram showing a cross section before galvanized steel plates are welded together in accordance with the exemplary embodiment of the present invention.
Figure 7:
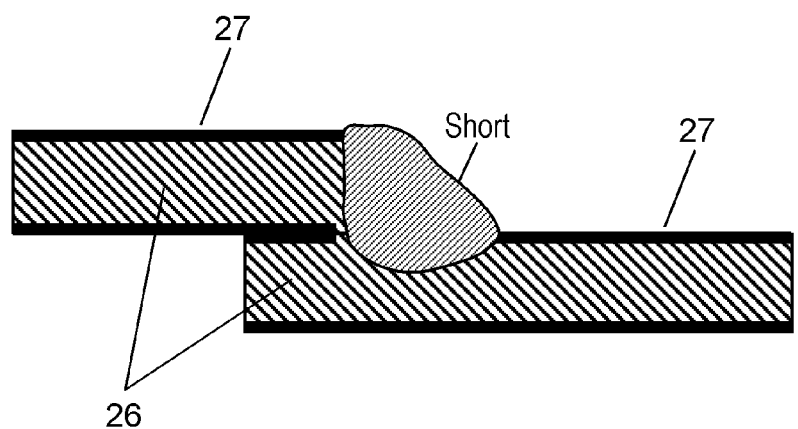
FIG. 7 is a diagram showing a bead cross section when the galvanized steel plates are welded together in accordance with the exemplary embodiment of the present invention.

When root part 32 of FIG. 3C and FIG. 6 is completely exposed by the arc force of arc 34, vaporized zinc 30 is easily released without occurrence of spatter or the like. When the thickness of molten metal 33 covering root part 32 is thin, namely about 0.5 mm or smaller, the release of vaporized zinc 30 is not disturbed. Thus, root part 32 of welding objects 26 is easily exposed by release of zinc caused by volume expansion, and vaporized zinc 30 is easily released to the outside. In other words, molten metal 33 may be pressed by the arc force of arc 34 so as to have such a thickness that vaporized zinc 30 generated from the upper plate and lower plate as welding objects 26 can release through molten part 29 and molten metal 33 that cover root part 32 of welding objects 26 due to volume expansion.

Root part 32 is the end of the overlapping part of the upper plate and lower plate as welding objects 26, and the length of root part 32 is the same as that of the welding direction of welding objects 26, as shown in FIG. 3A through FIG. 3C and FIG. 6. In FIG. 6, root part 32 extends vertically to the page space.

Thus, the welding current is controlled to control the arc force of arc 34 so that vaporized zinc 30 is released regularly and appropriately, thereby significantly suppressing the occurrence of spatter.

In order to regularly stabilize such a mechanism, preferably, the wire feeding is controlled so that the forward feeding and backward feeding are repeated. By repeating the forward feeding and backward feeding of the wire, the short circuit state and arc state can be regularly generated and the arc length immediately after the release of the short circuit can be instantly increased. By increasing the arc length immediately after the release of the short circuit, occurrence of a micro short circuit can be suppressed and molten metal 33 can be pressed in a large range by the arc force of arc 34.

In the conventional technology, for some joint types, peak current IP is not appropriate. In these cases, vaporized zinc 30 remains in molten metal 33 and forms blowhole 28 (or, pit). When vaporized zinc 30 is released vigorously from molten metal 33, scattering molten metal 33 short-circuits with welding wire 21 to enhance the occurrence of spatter.

Figure 4A:
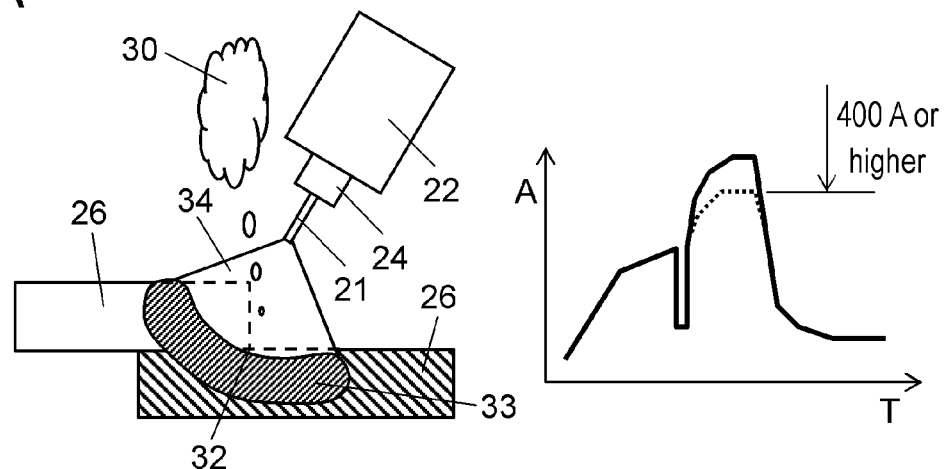
FIG. 4A is a diagram showing a welded state of a lap fillet and the welding current in accordance with the exemplary embodiment of the present invention.
Figure 4B:
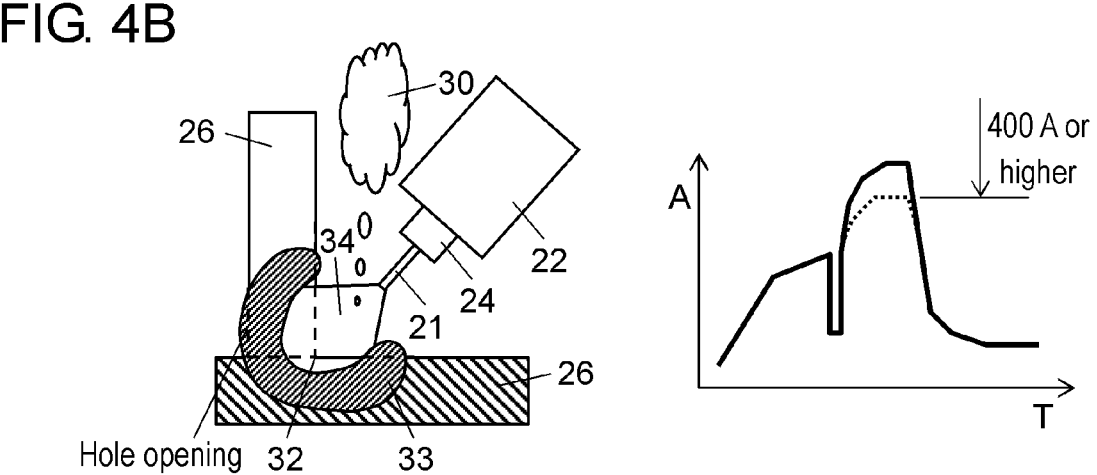
FIG. 4B is a diagram showing a welded state of a horizontal fillet and the welding current in accordance with the exemplary embodiment of the present invention.
Figure 4C:
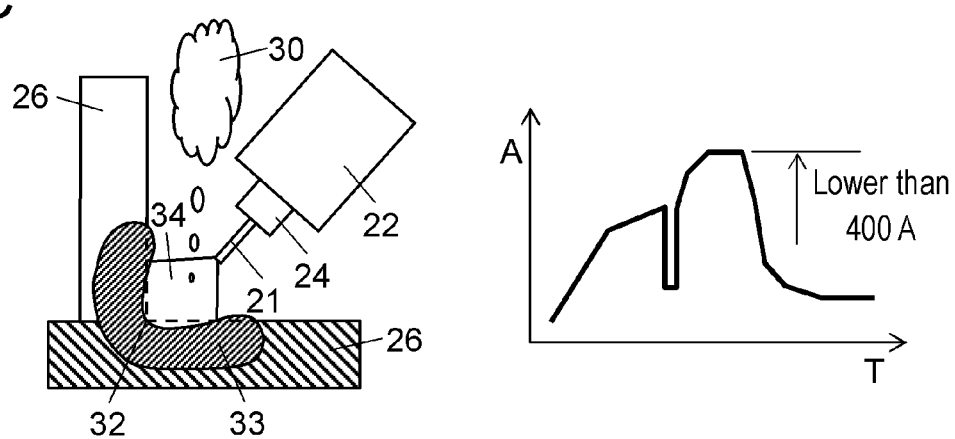
FIG. 4C is a diagram showing another welded state of the horizontal fillet and the welding current in accordance with the exemplary embodiment of the present invention.

Next, in welding of the galvanized steel plate, the necessity to use appropriate peak current IP in response to each joint type is described using FIG. 4A through FIG. 4C. FIG. 4A through FIG. 4C show cross sections vertical to the welding direction. FIG. 4A shows a state where a lap fillet is welded sufficiently. FIG. 4B shows a state where a horizontal fillet is not welded sufficiently and a hole opening occurs. FIG. 4C shows a state where a horizontal fillet is welded sufficiently.

As shown in FIG. 4A, when the joint type is a lap fillet, arc 34 is apt to spread. Therefore, preferably, peak current IP is 400 A or higher. By setting peak current IP at 400 A or higher, molten metal 33 is pressed out of root part 32 of welding objects 26 by the arc force of arc 34 immediately under arc 34, and root part 32 is exposed from molten metal 33. When root part 32 is exposed, vaporized zinc 30 is easily released to the outside from zinc plating vaporizing section 31, which is an overlapping part of the upper plate and lower plate.

In the case where the joint type is a horizontal fillet as shown in FIG. 4B, when peak current IP is set at 400 A or higher similarly to the lap fillet, arc 34 is easily concentrated. Therefore, especially, the arc force of arc 34 to the upper plate side is extremely strong, and a back bead is generated on the upper plate. In the worst-case scenario, a hole opening (burn-through) is formed in the upper plate. In the case of the horizontal fillet, therefore, it is preferable that peak current IP is lower than 400 A.

FIG. 4C also shows an example of the horizontal fillet. As shown in FIG. 4C, by setting peak current IP to be lower than 400 A, a hole opening does not occur in the upper plate. Molten metal 33 is pressed out of root part 32 of welding objects 26 immediately under arc 34, thereby exposing root part 32. Thus, vaporized zinc 30 can be easily released to the outside from zinc plating vaporizing section 31 (FIG. 6), which is the overlapping part of the upper plate and lower plate.

FIG. 5 shows a welding result related to the joint types and peak currents IP. FIG. 5 shows peak currents IP in increments of 50 A. The welding result of FIG. 5 shows an example where galvanized steel plates of a thickness of 2.3 mm are $CO_2$-welded together.

According to FIG. 5, the appropriate range of peak current IP for the horizontal fillet (T joint) is 250 A to 350 A, and the optimum value thereof is 300 A. When peak current IP is lower than 250 A, it is difficult to press molten metal 33 out of root part 32 of welding objects 26, and air hole 28 occurs. When peak current IP is higher than 400 A, the upper plate burns through to form a hole opening. When peak current IP is higher than 400 A and the upper plate is thick, the upper plate does not burn through but the appearance becomes poor. Also when peak current IP is 380 A (not shown in FIG. 5), sufficient welding can be performed. As a result, for the horizontal fillet (T joint), sufficient welding can be performed when peak current IP is 250 A or higher and lower than 400 A.

According to FIG. 5, the appropriate range of peak current IP for the lap fillet (lap joint) is 400 A to 500 A, and the optimum value thereof is 450 A. When peak current IP is lower than 400 A, it is difficult to press molten metal 33 out of root part 32 of welding objects 26, and air hole 28 occurs. When peak current IP is higher than 500 A, the melt pool is excessively dented to project the bead and the bead appearance becomes poor. As a result, for the lap fillet (lap joint), sufficient welding can be performed when peak current IP is 400 A or higher and 500 A or lower.

Thus, peak current IP needs to be set at an appropriate value in response to the joint type. The above-mentioned appropriate numerical ranges are obtained based on actual experiment or the like.

In the arc welder of the present exemplary embodiment, in order to set appropriate peak current IP in response to the joint type, a waveform parameter including peak current IP appropriate to each joint type is stored in waveform parameter storage section 15 of welding power supply device 16. Then, it is required to determine peak current IP appropriate to each joint type and output it based on the set contents set by welding condition setting section 17 in robot control device 19 and the set contents set by joint type setting section 18 therein.

By performing welding at peak current IP appropriate to each joint type, root part 32 of welding objects 26 can be exposed. A method of adjusting peak current period TP to a period appropriate to each joint type may be employed. According to the experiment or the like by the inventors, however, the adjustment of peak current period TP is insufficient for all joint types.

An example is considered where the joint type is a horizontal fillet, peak current IP is set at 450 A, higher than the appropriate range, and peak current period TP is set shorter than a default. In a method where the application duration of strong arc force at peak current IP of 450 A is shortened, the hole opening (burn-through) in the upper plate is reduced, but does not become zero. Therefore, this method has a low advantage.

While, an example is considered where the joint type is a lap fillet, peak current IP is set at 300 A, lower than the appropriate range, and peak current period TP is set longer than the default. In a method where the application duration of weak arc force at peak current IP of 300 A is elongated, it is difficult to press molten metal 33 out of root part 32 of welding objects 26, and root part 32 cannot be exposed. Therefore, air hole 28 is apt to occur.

Thus, it is important to output appropriate peak current IP.

The present exemplary embodiment has described an example where peak current IP is determined based on the set welding current and joint type. However, the set welding current is proportional to the wire feeding speed or wire feeding amount. Therefore, also when a parameter or the like related to peak current IP is determined based on the wire feeding speed or wire feeding amount instead of the set welding current, the same advantage can be produced.

In the above-mentioned example, the wire feeding speed is controlled so that it has a sine wave form shown in FIG. 2. However, the same advantage can be produced also when the wire feeding speed is controlled so that it has a trapezoidal wave form shown in FIG. 8.

Figure 8:
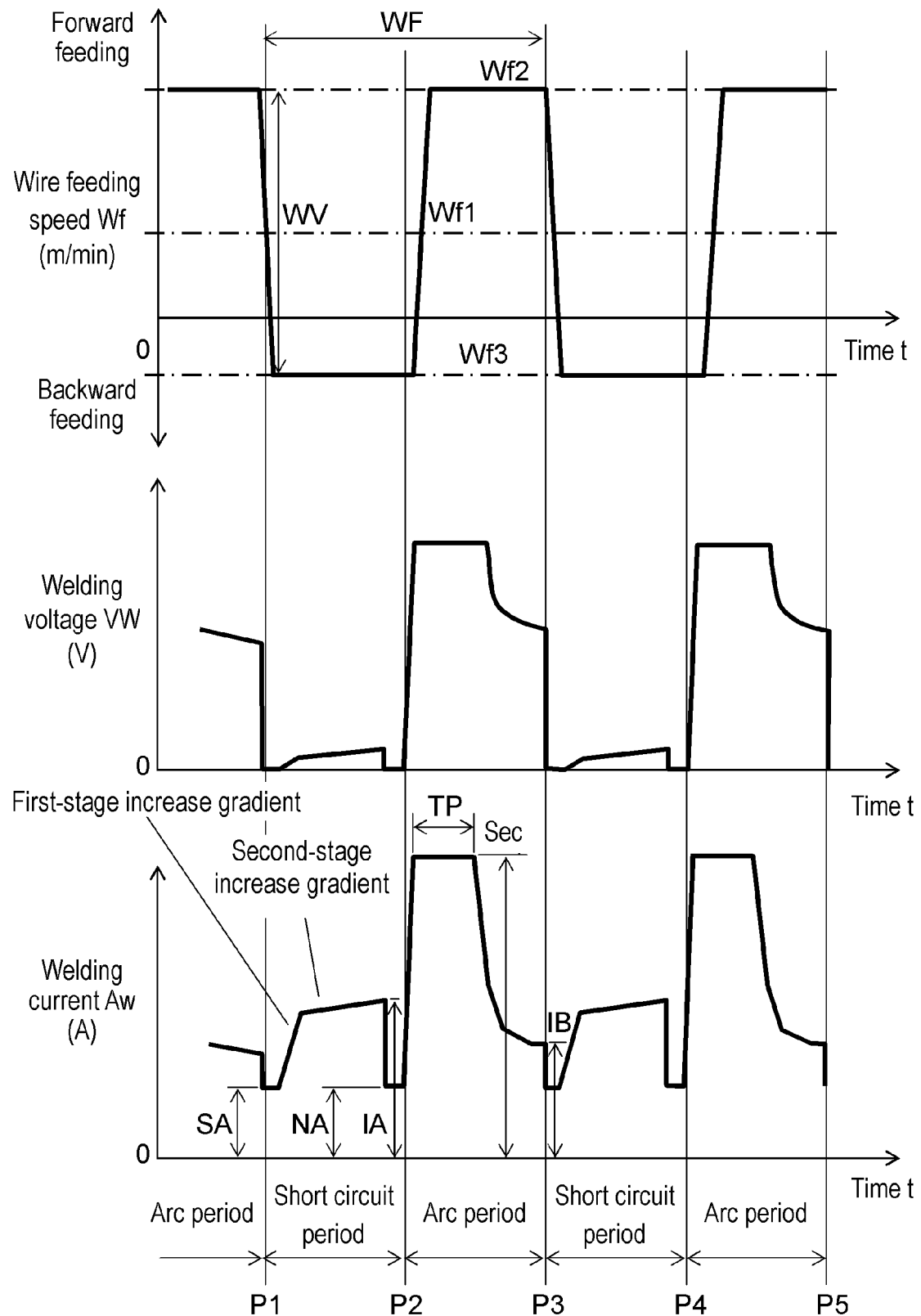
FIG. 8 is a diagram showing waveforms of wire feeding speed (trapezoidal wave), welding voltage, and welding current in accordance with the exemplary embodiment of the present invention.
Figure 9:
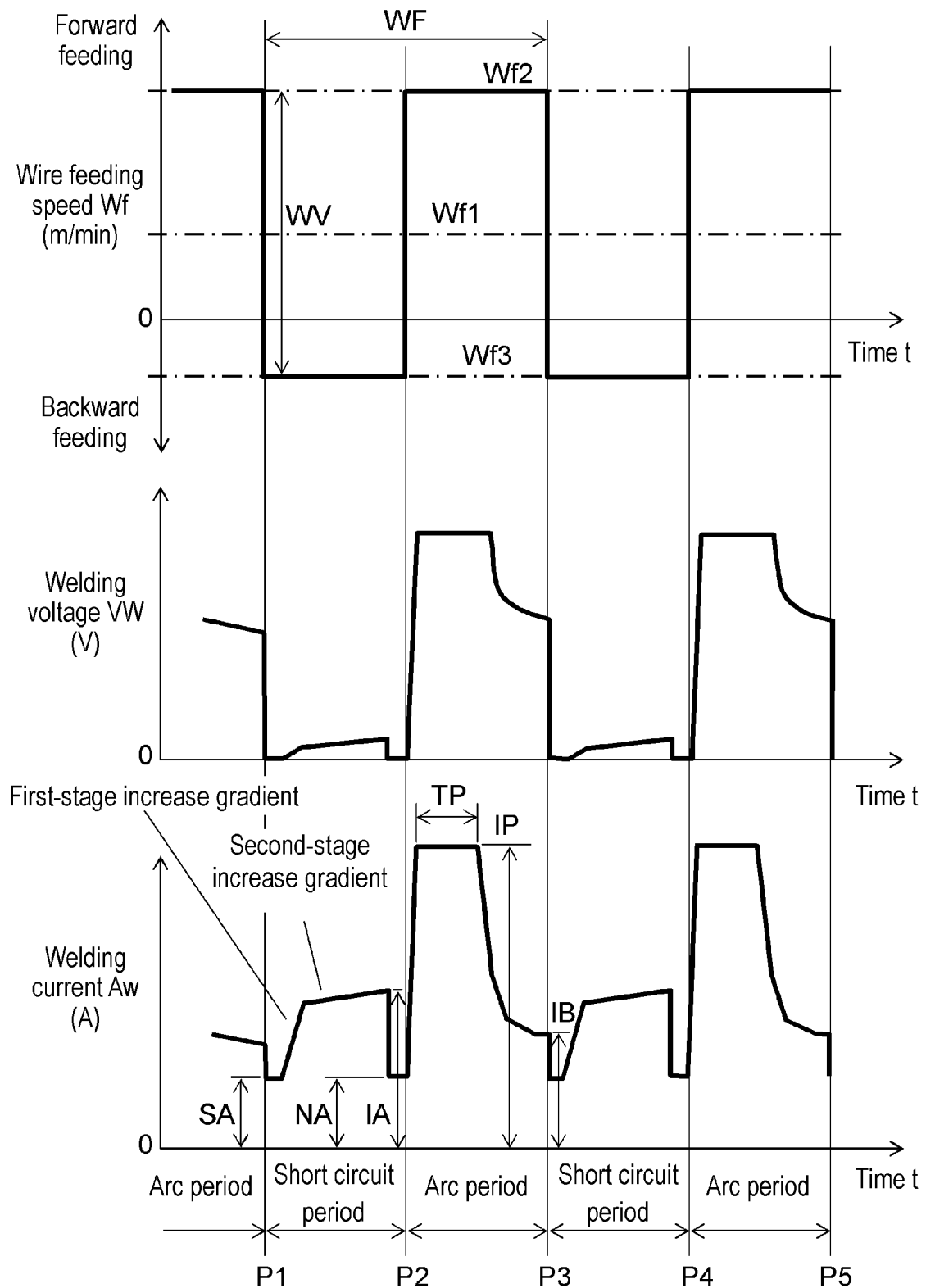
FIG. 9 is a diagram showing waveforms of wire feeding speed, welding voltage, and welding current in accordance with the exemplary embodiment of the present invention.
Figure 10:
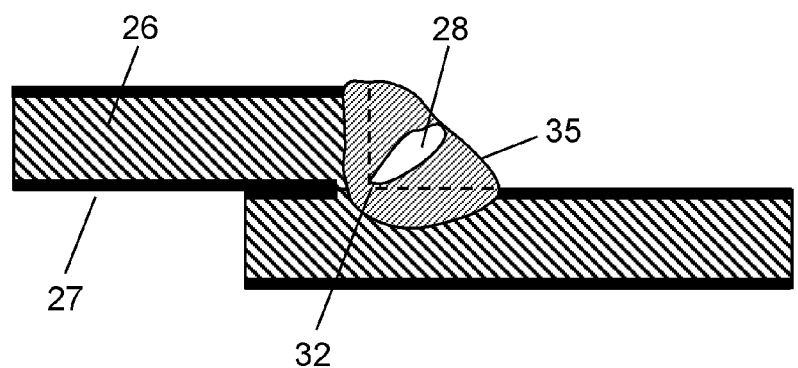
FIG. 10 is a diagram showing a welding bead cross section when the galvanized steel plates are welded together by a conventional method for controlling arc welding.
Figure 11:
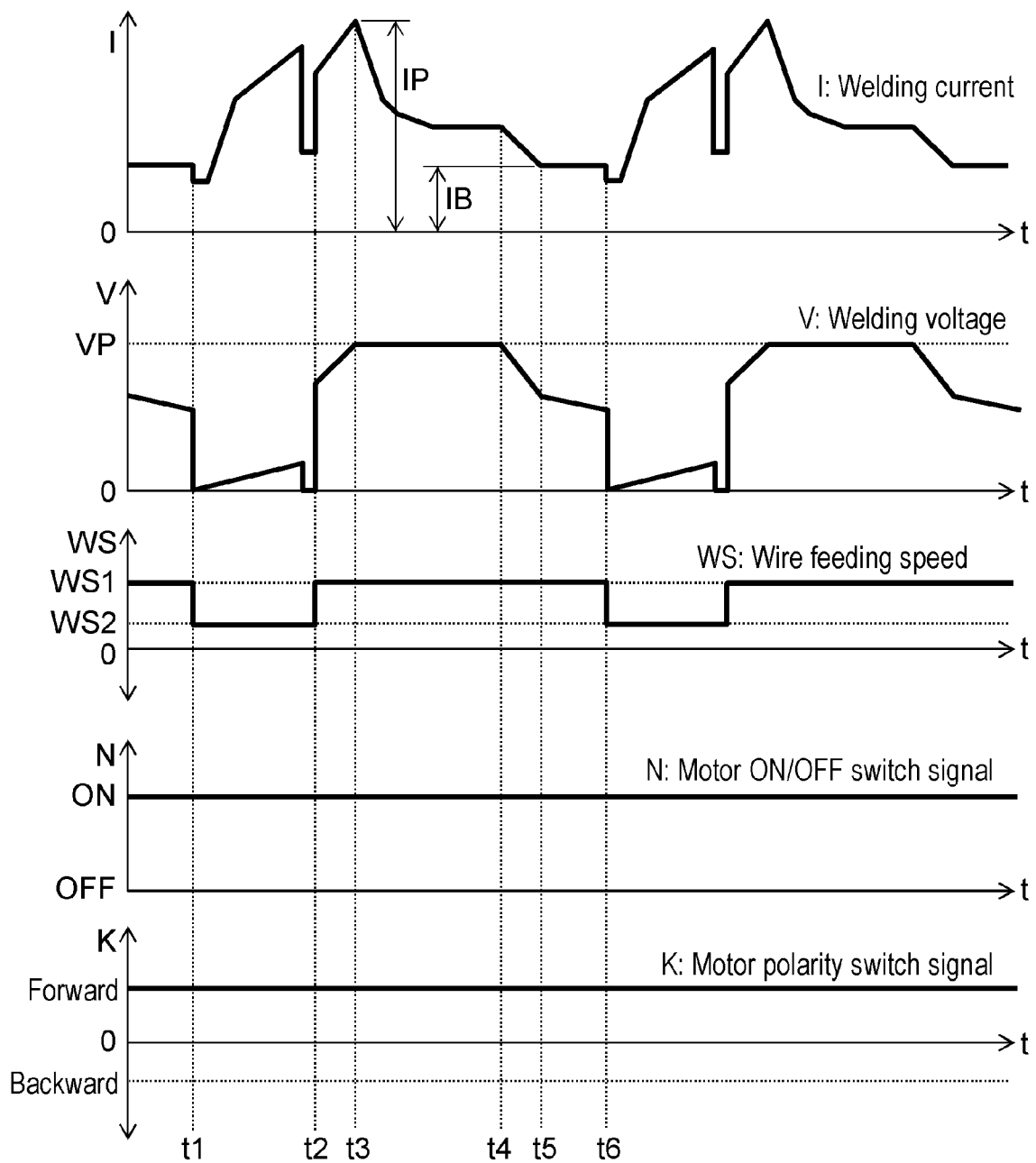
FIG. 11 shows time variation in welding current I, welding voltage V, wire feeding speed WS, motor ON/OFF switch signal N, and motor polarity switch signal K that are related to the conventional method for controlling arc welding.

Also when feeding control according to the welding state shown in FIG. 9 is performed instead of the cyclic feeding control shown in FIG. 2 and FIG. 8, the same advantage can be produced. In other words, the same advantage can be produced also when the wire feeding is controlled so that backward feeding is performed when the welding state is detected to be a short circuit state and forward feeding is performed when the welding state is detected to be an arc state.

Immediately before time P2, when the release of the short circuit approaches, a droplet constriction that is formed between the melt pool in the welding objects and the tip of the welding wire is detected. When the droplet constriction is detected, constriction control is performed. In the constriction control, the welding current is instantly decreased to constriction current NA, which is lower than the current when the droplet constriction is detected. However, even when the constriction control is not performed, the welding control of the present exemplary embodiment increases the effect of reducing the influence of the zinc plating on the spatter or blowhole.

In the present invention, when a welding object such as a galvanized steel plate having undergone surface treatment is welded using a wire for welding, a peak current corresponding to a joint type is output in an arc period. Thus, a hole opening (burn-through) is not formed in the welding object, and gas generated from the welding object releases from an exposed area when the melt pool is pressed so as to expose a root part of the welding object. Therefore, occurrence of a blowhole or the like and occurrence of spatter can be extremely suppressed. The present invention is industrially useful as an arc welder and a method for controlling arc welding for welding the welding object such as a galvanized steel plate that has undergone surface treatment and generates gas during welding.

What is claimed is:

1. A method for controlling arc welding of steel plates of a welding object in lap joints and T joints, the steel plate being formed of a plated steel plate subjected to surface treatment, performed by an arc welder for alternately repeating a short circuit period in which a short-circuit occurs between a welding wire and the welding object and an arc period in which an arc occurs between the welding wire and the welding object, the method comprising:
receiving from a user a set joint type, which is a type of weld joint to be performed;
storing in a non-transitory electronic memory a plurality of combination patterns, each including a joint type and a waveform parameter associated with each other, wherein each waveform parameter includes a value of a maximum welding current after a release of the short circuit, the stored joint type comprising a lap joint or a T joint;
selecting a waveform parameter, by a welding power supply, from the plurality of stored combination patterns, that corresponds to the set joint type, and outputting a control signal to control welding based on the selected waveform parameter; and
controlling the arc welder based on the selected waveform parameter as to alternately repeat a short circuit period in which a short-circuit occurs between the welding wire and the welding object, and an arc period in which an arc occurs between the welding wire and the welding object,
wherein the arc welder outputs a welding current to the welding wire based on the selected waveform parameter, and so as to feed the welding wire toward the welding object by repeating forward feeding and reverse feeding of the wire feeding at a feeding speed varying cyclically at a predetermined time cycle and a predetermined amplitude according to a sine wave form or trapezoidal wave form,
said controlling the arc welder comprises:
after releasing the short-circuit, controlling the arc welder as to increase the welding current to the maximum welding current value included in the selected waveform parameter, and to press a melt pool with an arc in the direction opposite to the welding direction so as to expose a root part which is an end of an overlapping part of an upper plate and a lower plate of the welding object, and to weld the welding object so that a gas generated from the welding object escapes from a vaporized point to an outside of the melt pool, said controlling the arc welder further comprises:

when the joint type to be performed is the T joint, setting the maximum welding current value after the release of the short circuit to greater than or equal to 250 A and less than 400 A, and when the joint type to be performed is the lap joint, setting the maximum welding current value after the release of the short circuit to greater than or equal to 400 A and less than 500 A.

* * * * *